Aug. 8, 1933.    G. M. KRIEGBAUM ET AL    1,921,886
FERTILIZER DISCHARGING UNIT
Filed Aug. 27, 1932    2 Sheets-Sheet 1

Inventors
George M. Kriegbaum
Clarence C. Haas

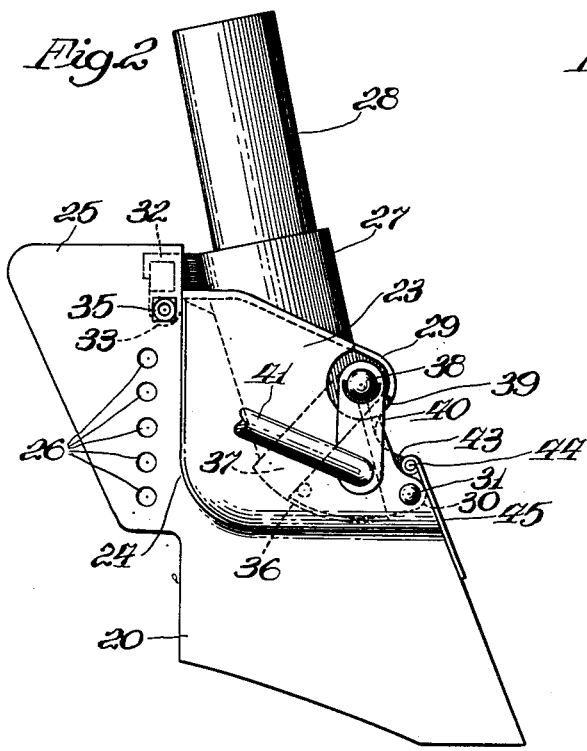
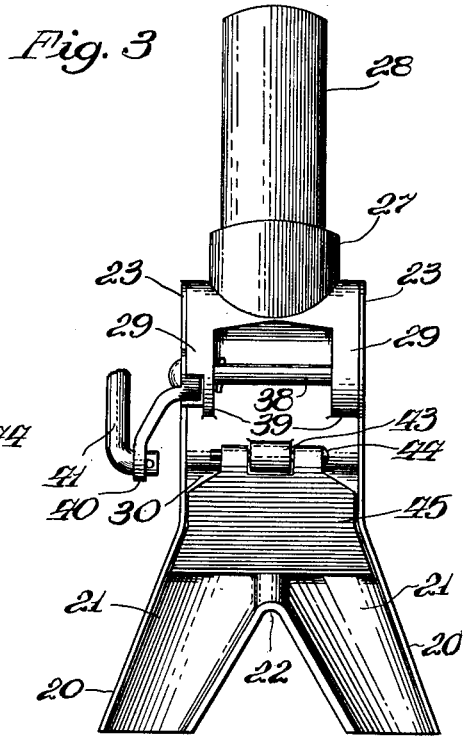
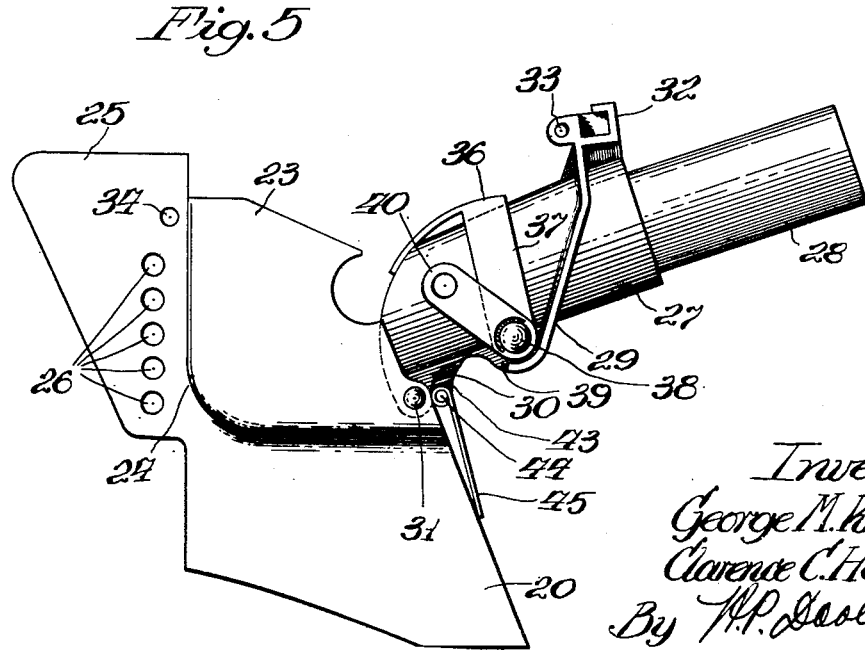

Patented Aug. 8, 1933

1,921,886

UNITED STATES PATENT OFFICE 1,921,886

FERTILIZER DISCHARGING UNIT

George M. Kriegbaum and Clarence C. Haas, Richmond, Ind., assignors to International Harvester Company, a Corporation of New Jersey Application August 27, 1932. Serial No. 630,638

7 Claims. (Cl. 111—73)

The present invention relates to fertilizer depositing devices used as attachments on planters of standard construction.

The main object of the invention is to provide a fertilizer depositing unit for mounting on the rear of a planter boot, so constructed as to permit ready access to the conduits and valve comprised therein, for inspection or cleaning, while the unit remains in position on the planter boot.

With this principal object in view, a unit of the character stated has been devised which comprises sections which may be swung apart to expose the interior thereof, which unit otherwise retains the general form and mode of operation disclosed and claimed in assignee's copending application Serial No. 542,732 filed June 8, 1931.

A preferred construction embodying the improvements constituting the present invention is hereinafter described and is illustrated in the accompanying drawings, where:

Figure 2 is an enlarged side view of the fertilizer depositing unit seen in Figure 1;

Figure 3 is a rear view of the same;

Figure 5 is a side view, showing the sections of the unit in opened position.

Figure 1:
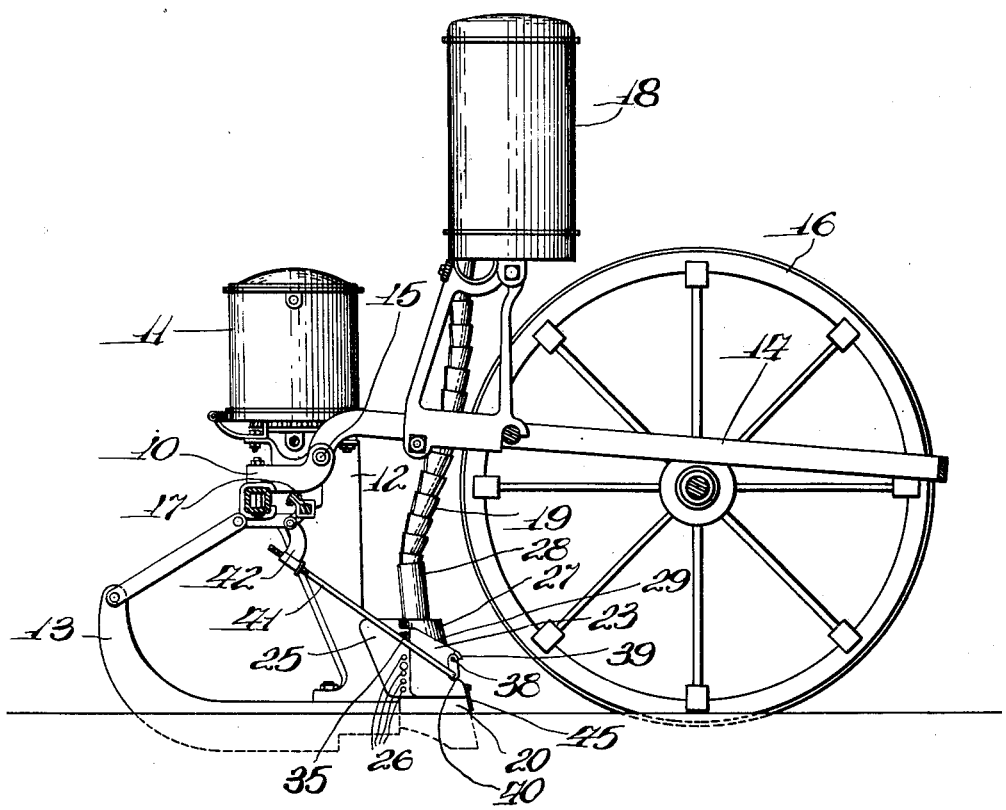
Figure 1 is a side elevation of a portion of a combined planter and fertilizer distributor embodying the invention.
Figure 4:
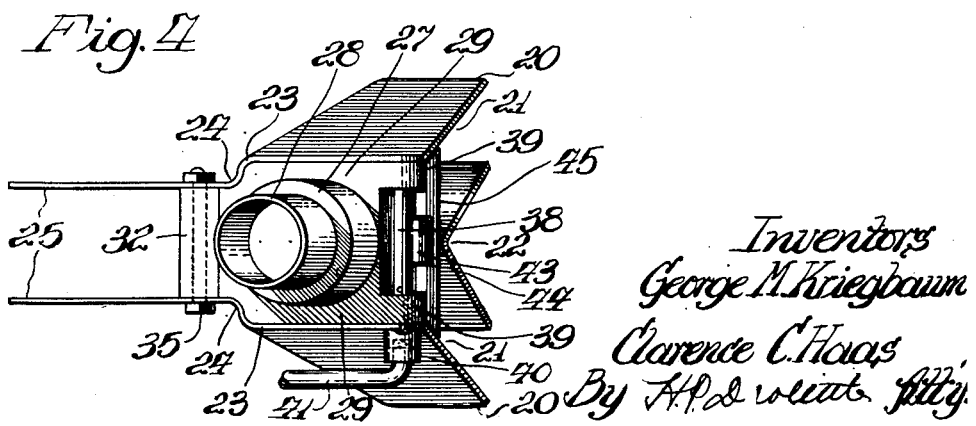
Figure 4 is a top or plan view.

In the present instance, the invention is disclosed in connection with a check-row corn planter comprising the usual front runner frame 10 carrying the seed hoppers and seed dispensing mechanisms 11 discharging in the seed boots 12 at the rear of the furrow opening runners 13. The usual rear frame 14 is pivotally connected at 15 to the runner frame and is supported on ground wheels 16. The seed boots contain the usual second drop valves operated by rocking movements of the check-row shaft 17. Fertilizer hoppers 18 are mounted on the rear frame and contain dispensing mechanism discharging into the flexible tube 19 leading to the fertilizer depositing unit now to be described.

The fertilizer depositing unit of the present invention is of two part construction and consists of a lower section 20, the lower part of which constitutes a ground engaging and furrow forming element. This ground engaging part is preferably formed as two downwardly diverging conduit portions 21 separated by a central inverted V-shaped channel 22, which serves to open lateral furrows for the fertilizer and to cover and pack the soil over the seed deposited from the seed boot ahead of it. The chutes or conduits 21 incline downwardly and rearwardly and are cut away or open at the rear, as best seen in Figure 3. The lower section also comprises upwardly extending spaced side walls 23 connected at the front by inwardly bent portions 24 with forwardly extending, spaced wings 25 adapted to embrace the seed boot and provided with a vertical series of bolt holes 26 for adjustably connecting it to the boot. The side walls 23 together with the rear surface of the seed boot form three sides of a chamber which opens at the bottom into the chutes 21. The upper unit consists of a tubular member 27 having a short upward extension 28 within which the lower end of the flexible tube 19 of the fertilizer hopper is telescopically received. The tubular member 27 is formed with a laterally extending flange 29 which conforms to the top and rear of the chamber formed by the walls 23 and 24 and serves to close this chamber when the tubular member is in substantially normal or upright position, as in Figures 2 and 3. On the rear side of the tubular member, at its lower end, there is formed a bearing portion 30 which is formed with an opening to receive a pivot pin 31 mounted in the rear edge of the side walls 23. The flange 29 at the forward side of the tubular member is formed with a head 32 which fits between the wings 25 when the tubular member is in normal position and the lower portion of which is formed as a sleeve 33 which registers with openings 34 at the rear edge of the wings 25 for reception of a suitable fastening pin or bolt 35. The lower open end of the tubular member 27 is provided with a rocking plate valve 36 adapted to control the flow of fertilizer from the tubular member. This valve is formed with arms 37 extending upwardly to a pintle 38 mounted in lugs 39 formed on the rear side of the tubular member 27. The arms 37 are pivoted on the ends of the pintle 38 and one of these arms has fixed thereto a crank arm 40 pivotally connected by a link 41 with an arm 42 on the check-row shaft of the planter. Accordingly, at each actuation of the check-row shaft, the valve plate 36 will be swung forwardly a sufficient time to allow a charge of fertilizer to be delivered into the chamber leading to the chutes 21. Preferably, the rear surface of the upper section of the unit is formed with a bearing lug 43 (Figure 3) to receive a pin 44 from which an apron 45 is suspended, which serves to close the lower portion of the fertilizer receiving chamber, to better assure that the fertilizer will be deposited in separate streams by the chutes 21.

With the construction above described, a fertilizer depositing unit is provided which delivers fertilizer from a conduit intermittently in divided streams at each side of the furrow containing the seed and also one which may be readily opened for inspection and cleaning in case any clogging of fertilizer occurs within the unit. When it is desired to swing back the upper section of the unit, as illustrated in Figure 5, it is only necessary to disconnect the link 41 from the arm 40 and to remove the bolt 35, whereupon the upper section is free to swing on the pivot 31. There has accordingly been constructed a two-part fertilizer distributing unit which is compact and so constructed that a closed unit is provided when the parts are in a normal position, while affording a ready means for giving access to the interior of the unit when desired.

While a preferred embodiment of the invention is illustrated herein, the details of construction may be varied without departure from the scope of the invention as defined in the following claims.

What is claimed is:

1. In a fertilizer depositing attachment for planters, a unit comprising hingedly connected upper and lower sections, the lower section comprising a ground engaging portion inclosing a discharge chute and having upwardly extended side walls, the upper section comprising a tubular conduit pivotally connected to the lower section, and releasable means for securing the tubular conduit in normal upright position between said side walls.

2. In a fertilizer depositing attachment for planters, a unit comprising hingedly connected upper and lower sections, the lower section comprising a ground engaging portion inclosing a discharge chute and having upwardly extended side walls, the upper section comprising a tubular conduit having a bearing on its rear side engaging a pintle supported in the side walls of the lower section, and releasable means on the opposite side of the conduit for securing the upper section to the lower section with the tubular conduit in normal upright position between the side walls.

3. In a fertilizer depositing attachment for planters, a unit comprising hingedly connected upper and lower sections, the lower section being formed with a ground engaging portion inclosing a discharge chute opening rearwardly and with upwardly extended side walls, the upper section comprising a tubular conduit hingedly supported at its rear side on the lower section, a pivotally suspended apron on the upper section partly covering the chute opening, and releasable means for securing the upper section with the tubular conduit in normal upright position between the side walls.

4. In a fertilizer depositing attachment for planters, a unit comprising a lower section formed with downwardly diverging conduit members constituting furrow openers and with upwardly extended side walls to form the sides of a chamber leading to said conduit members, the upper section comprising a tubular conduit having its lower end normally positioned upright between said side walls and having lateral flanges normally closing the top and rear side of the chamber, and means for tiltably supporting the upper section on the lower section.

5. In a fertilizer depositing attachment for planters, a unit comprising a lower section formed with downwardly diverging conduit members constituting furrow openers and with upwardly extended side walls to form the sides of a chamber leading to said conduit members, the upper section comprising a tubular conduit having its lower end normally positioned upright between said side walls and having lateral flanges normally closing the top and rear side of the chamber, means for pivotally supporting the upper section on the lower section for tilting movement on an axis located behind the lower end of the tubular conduit, and releasable means for securing the sections in normal position.

6. In a fertilizer depositing attachment for planters, a unit comprising a lower section formed with downwardly diverging conduit members constituting furrow openers and with upwardly extended side walls to form the sides of a chamber leading to said conduit members, the upper section comprising a tubular conduit having its lower end normally positioned upright between said side walls and having lateral flanges normally closing the top and rear side of the chamber, means for pivotally supporting the upper section on the lower section for tilting movement on an axis located behind the lower end of the tubular conduit, a swinging valve plate closing the end of said tubular member and carried thereby, actuating means for said valve, and releasable means for securing the sections in normal position.

7. A fertilizer depositing attachment adapted for attachment to a planter boot comprising a fixed lower section formed as a furrow forming and fertilizer depositing means, an upper section fitted within the lower section having a valve controlled conduit for supplying fertilizer to the lower section, and means for tiltably mounting the upper section on the lower section to permit access to the interior of the lower section and to said valve.

GEORGE M. KRIEGBAUM.
CLARENCE C. HASS.